United States Patent [19]

Asai et al.

[11] Patent Number: 4,718,771
[45] Date of Patent: Jan. 12, 1988

[54] CLOSED MIXING MACHINE

[75] Inventors: Toshihiro Asai; Katsunobu Hagiwara, both of Kobe, Japan

[73] Assignee: Kabushiki Kaisha Kobe Seiko Sho, Kobe, Japan

[21] Appl. No.: 896,962

[22] Filed: Aug. 15, 1986

[30] Foreign Application Priority Data

Aug. 22, 1985 [JP] Japan ............................ 60-184506

[51] Int. Cl.$^4$ ............................ B01F 7/00; B29B 1/06
[52] U.S. Cl. ........................................ 366/97; 366/300
[58] Field of Search .................... 366/83, 84, 85, 97, 366/297, 298, 299, 300, 301; 425/207, 208, 209, 205, 204

[56] References Cited

U.S. PATENT DOCUMENTS

| 4,113,822 | 9/1978 | Takiura | 366/85 |
| 4,284,358 | 8/1981 | Sato | 366/97 |
| 4,300,838 | 11/1981 | Sato | 366/97 |
| 4,456,381 | 6/1984 | Inoue | 366/300 |
| 4,474,475 | 10/1984 | Moriyama | 366/97 |

Primary Examiner—Robert W. Jenkins
Attorney, Agent, or Firm—Oblon, Fisher, Spivak, McClelland, & Maier

[57] ABSTRACT

A closed mixing machine suitable for mixing rubber materials, which includes a closed mixing chamber and a pair of rotors received in the chamber for rotating in opposite directions, wheren the rotor tips' clearance and the rotor rotation speed are increased up to values greater than typical values of the conventional mixing machine. Accoridng to this arrangement, mixing productivity is increased by a maximum of 70% with the even discharge temperature and energy consumption is reduced in comparison with the conventional machine.

1 Claim, 18 Drawing Figures

CIRCUMFERENCE DISTANCE FROM ROTOR TIP

CLOSED MIXING MACHINE

BACKGROUND OF THE INVENTION

1. Field of the Invention

The present invention relates to an improvement in a closed mixing machine, and more particularly a mixing machine for mixing a rubber material or a plastic material.

2. Description of the Prior Art

A closed mixing machine is adapted to perform a batch mixing of rubber or a plastic material. More particularly, the machine allows for a plasticization mixing of the rubber material, and batch mixing of a carbon master with or without a sulfurizing agent in manufacturing rubber products such as a tire.

There are a number of conditions required in such mixing machine, particularly a reduced period of mixing time for improving productivity, an increased degree of dispersion of additives for achieving improved mixing, and prevention of excessive heat generation of the mixing material.

The mixing performed by the batch-type mixing machine includes basic processes consisting of macro-dispersion, distributive mixing, and micro-dispersion of the material. Macro-dispersion is mainly caused by an axial propulsive force created by helical vanes of a rotor rotatable in a mixing chamber, while the micro-dispersion thereof is caused by a strong shearing force of the vanes acting on the material moving in a direction normal to the rotor axis, as disclosed in Japanese Patent Laid-Open Publication Nos. 58-4567, 58-887, 58-888, 58-5094 and 59-31369.

The conventional mixing machines proposed in the foregoing documents provide improvements relating only to the macro-dispersion by modifying a length, helical angle of the rotor vanes, and a ratio of the length to the diameter of the mixing chamber. Such improvements were sought in view of the necessity of higher productivity and improved mixing quality, and for keeping the material at a relatively low temperature during the mixing operation. However, the foregoing mixing machine fails to provide a suitable arrangement for performing a desired effective micro-dispersion of the material.

With reference to FIGS. 1 to 4 of the accompanying drawings, the micro-difusion is described more specifically hereinbelow.

Figure 1A:
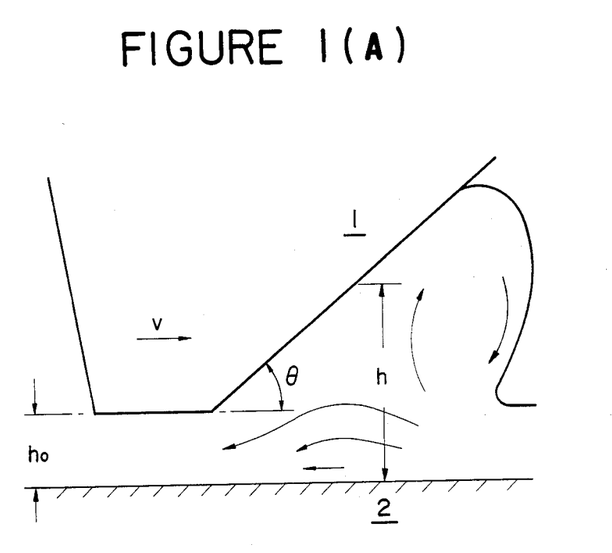
FIG. 1(A) shows the manner in which material flows in a direction normal to the rotor axis of a conventional mixing machine.
Figure 1B:
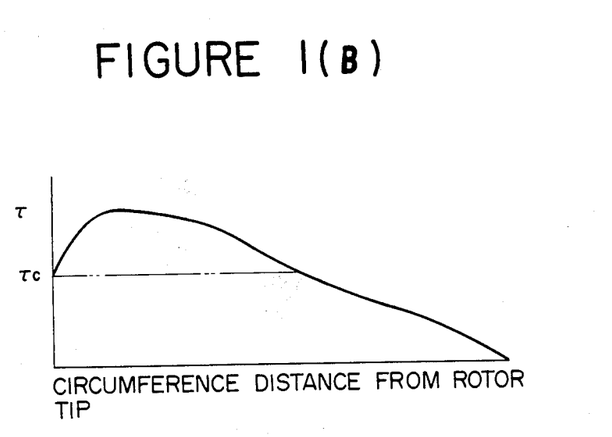
FIG. 1(B) shows the relationship between shearing stress and circumference distance from rotor tip of a conventional mixing machine.

FIG. 1 shows the manner in which the material flows in the direction normal to the rotor axis of the conventional mixing machine and also the manner in which shearing stress works on the mixing material. The shearing stress $\tau$ varies in strength at different points distributed on a plane normal to the axis of the rotor 1. A greater shearing force or stress created in a region near a rotor tip serves to shear and plasticize the mixing material such as a rubber material and to disperse additives such as carbon black. In FIG. 1, reference numerals 2, v, ho, h and $\theta$ indicate a wall of the mixing chamber, rotor speed, a tip clearance, a distance between the rotor front face and the chamber wall, and a front (inclusion) angle, respectively.

It is important to disperse the additives sufficiently in the mixing material in manufacturing tires. In order to achieve sufficient dispersion of the additives, the rotor needs to apply a shearing force greater than a determined minimum shearing stress $\tau c$ to the material. Accordingly, an increased shearing stress is required to achieve an improved micro-dispersion.

In the case of mixing of the rubber material, the shearing stress $\tau$ is given by the following expression (1) and if a drag flow concept can be adopted, a rate of shear $\dot{\gamma}$ is given by the following expression (2):

$$\tau = K \cdot \dot{\gamma}^\eta \qquad (1)$$

$$\dot{\gamma} = \frac{\pi \cdot R \cdot N}{60h} \qquad (2)$$

where n denotes a viscosity index greater than 0, R is a rotor diameter, N is a rotor rotation speed (rpm), and K is a viscosity coefficient (which decreases as a temperature of the rubber material increases). In view of the foregoing behavior of the mixing material, the following arrangement can be envisaged to improve the micro-dispersion of the mixing machine:

(A) Increasing the shearing stress $\tau$ in an overall cross section normal to the rotor axis while enlarging a region permitting $\tau > \tau c$.

(B) Increasing an opportunity for the material to pass through the region permitting $\tau > \tau c$ near the rotor tip.

The arrangement (A) allows for increasing $\tau$ of the expression (1) as a whole of a shearing region, and more particularly, from the arrangement (A) the following arrangement can be envisaged:

(A-1) Increasing N of the expression (2) with a determined cross-sectional shape of the rotor unchanged.

(A-2) Decreasing ho of the expression (2) with a determined N.

(A-3) Decreasing h and hence $\theta$ with a determined N and ho.

These arrangements have been practiced independently or jointly in the conventional mixing machine, however, they did not exhibit an advantageous result for the reasons described hereinbelow.

The arrangements (A-1) and (A-2) have a drawback in that a maximum shearing stress $\tau$max which can be obtained at the tip region increases to such an extent that an excessive torque is caused at the time of charging the material in the initial mixing operation, and a rapid increase of heat occurs to thereby decrease $\tau$ soon due to the fact that the viscosity coefficient K decreases as the temperature of rubber material increases. As a result, the micro-dispersion cannot be improved. Such a drawback becomes serious if the material is required to be mixed at a lower temperature.

The arrangement (A-3) has a drawback in that the rotor fails to pull the material into the chamber at the initial stage of mixing operation, and requires an increased period of time for completing the operation.

As understood from the foregoing description, application of the arrangement (A) for increasing N and decreasing h is restricted to a certain extent. In view of such restriction, the batch-typed mixing machine for mixing rubber materials needs to be designed and manufactured based on empirically established standards.

Figure 2:
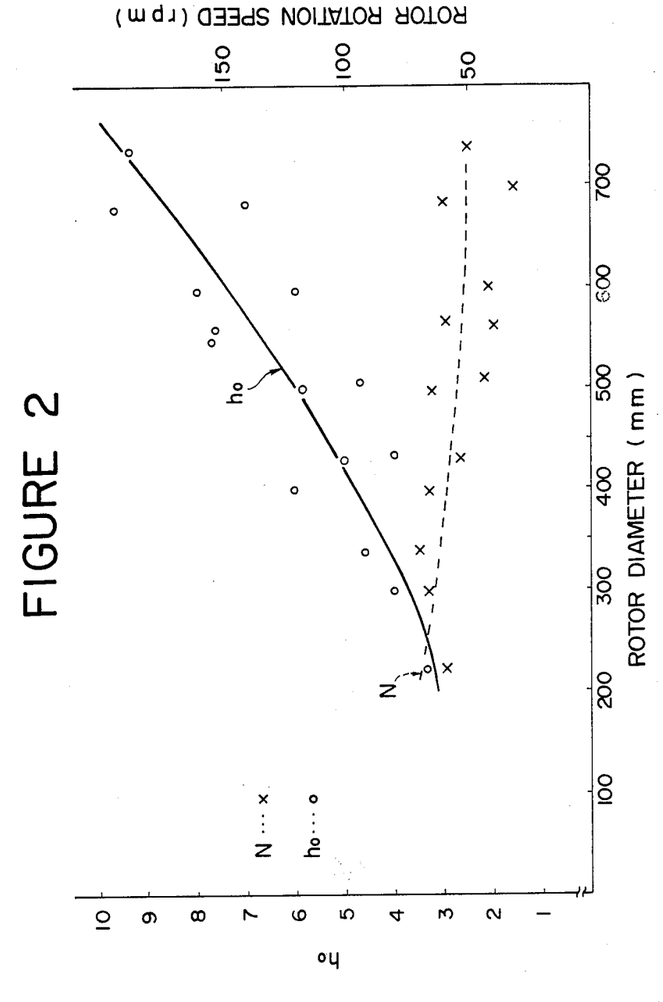
FIG. 2 is a chart showing a relation between a rotor diameter R and a tip clearance ho, and a relation between the rotor diameter R and a rotation speed N of the conventional mixing machine for mixing a rubber material.

FIG. 2 shows a part of the specifications for designing the conventional batch-typed mixing machine, in which the tip clearance ho and the rotation speed N are determined on the basis of a certain standard regardless of the rotor diameter R, and specifically N is 40–70 rpm.

Figure 3:
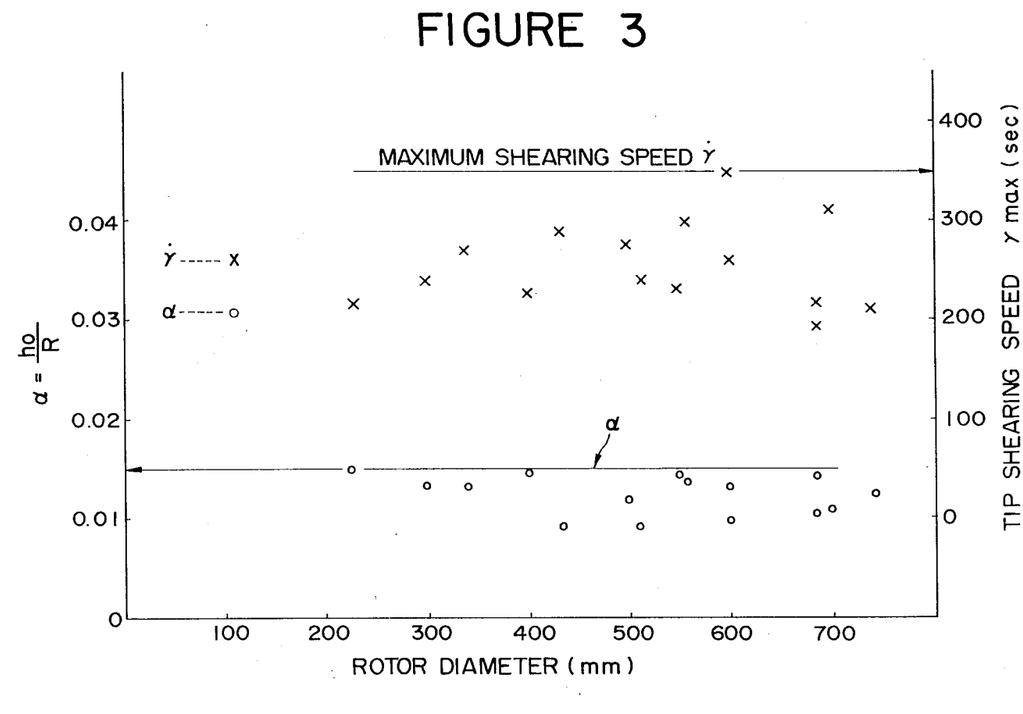
FIG. 3 is a chart showing a relation between the rotor diameter R, and ho/R ratio (=α) and a rate of shear of the shearing portion γ̇max of the conventional mixing machine.

This arrangement is apparent from FIG. 3 which shows that the maximum shearing speed $\tau$max (only at the rotor tip region) is lower than 350 sec$^{-1}$, and the ratio $\alpha$ of the tip clearance ho to the rotor diameter R, i.e. ho/R=α, is set to be 0.01–0.015 regardless of the size of the mixing machine.

The arrangement (B) seeks to increase the amount of the material which undergoes shearing stress τ greater than the determined shearing stress τc (τ>τc) without increasing τ as exerted by the arrangement (A). Specifically, the following arrangement is envisaged:

(B-1) Increasing a number of rotor vanes to thereby allow an increased amount of the material to be subject to the shearing stress.

Figure 4A:
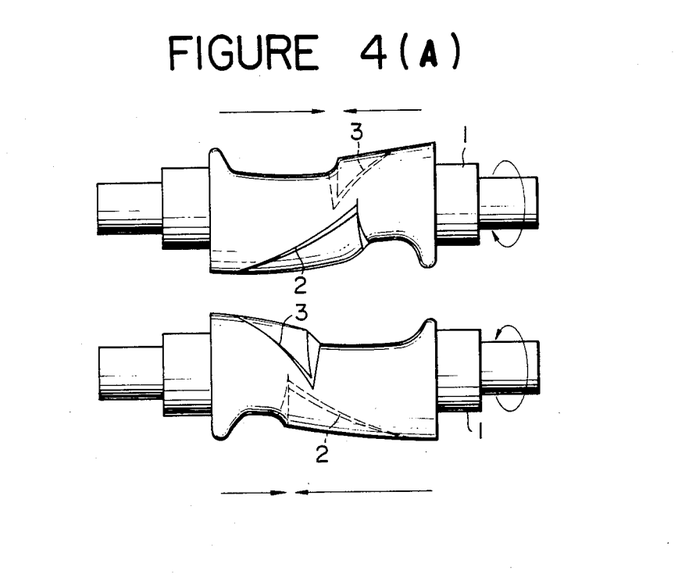
FIGS. 4A and 4B are plan views showing conventional twin-vane rotors and quadruple-vane rotors, respectively.
Figure 4B:
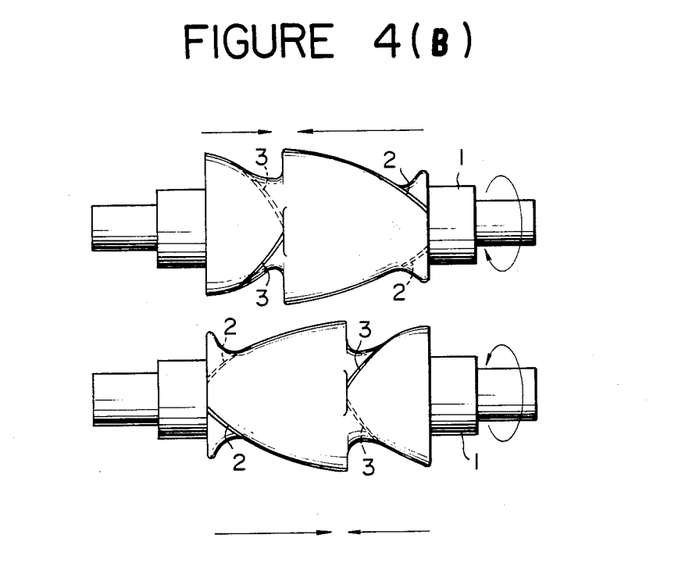

According to the arrangement (B-1), a pair of twin-vane rotors 1 each having a shorter vane 3 and a longer vane 2 and being rotatable in a mutually opposite direction as shown in FIG. 4a are replaced by a pair of quadruple-vane rotors 1 each having two shorter vanes 3 and two longer vanes 2, each rotor being rotatable in a mutually opposite direction. The quadruple-vane rotors complete the mixing for a period of time shorter than the twin-vane rotors, and increases the productivity by 20% in the break-down mixing of a natural rubber and in the master batch mixing of a carbon black.

The provision for the increased number of vanes, however, makes an effective mixing space of the mixing chamber smaller, and thus decreases an axial flow rate of the material to thereby impair the degree of mixing. As a result, the shape of the vanes needs to be modified.

To provide a further increased number of rotor vanes, for instance, to form a six-vane rotor or a quadruple-vane with additional vanes, would increase the possibility of occurrence of the foregoing drawback.

The above-described drawbacks in the conventional arrangements to improve the micro-dispersion of the material are summarized as follows:

The greater shearing stress by decreasing ho and by increasing N causes an excessive torque and excessive heat generation. The increased number of rotor vanes increase the opportunity for the material to undergo shearing stress and impairs the degree of mixing.

SUMMARY OF THE INVENTION

The present invention provides a mixing machine in which shearing stress τ acting on a material to be mixed in a radial direction on a plane normal to the rotor axis is kept at no more than the conventional or typical value (τmax>350), while an increased amount of the material is deliberately allowed to pass a region of a space defined by and between rotors and an inner wall of a mixing chamber, the space permitting the shearing stress τ greater than a determined value of shearing stress τc (τ>τc), so as to enable the mixing material to undergo the shearing stress effectively in a reduced period of time.

According to the invention, the foregoing arrangement (B) can be achieved by accomplishing an increased rotor tip clearance ho and an increased rotation speed N higher than the conventional typical speed.

More specifically, according to the invention, a closed mixing machine comprising a casing and a pair of end frames for jointly defining a mixing chamber, and a pair of parallel rotors disposed in the latter for rotating in mutually opposite directions, wherein the ratio of a rotor tip clearance ho to a rotor diameter R, i.e. ho/R, is 0.015<α<0.04, to rotor rotation speed N is 70–250 rpm, to differential rotation ratio of the rotors is 1.0–1.2, the rotor length/chamber diameter ratio (L/D ratio) is 1.2–2.2, rotor front or inclusion angle is 15°–35°, the rotor vane length ratio Ls/Le is 0.1–0.48, and the rotor vane helix angle θl, θs are 20°–45°, 0°–45°, respectively, where numerals Ls, Ll, θl and θs means respectively the length of the shorter vane, a length of the longer vane, the longer vane helix angle and a shorter vane helix angle.

It is therefore an object of the present invention to provide a closed mixing machine comprising an arrangement to achieve an improved effect of the shearing stress acting on the material to be mixed.

BRIEF DESCRIPTION OF THE INVENTION

DETAILED DESCRIPTION OF THE PREFERRED EMBODIMENT

Figure 5A:
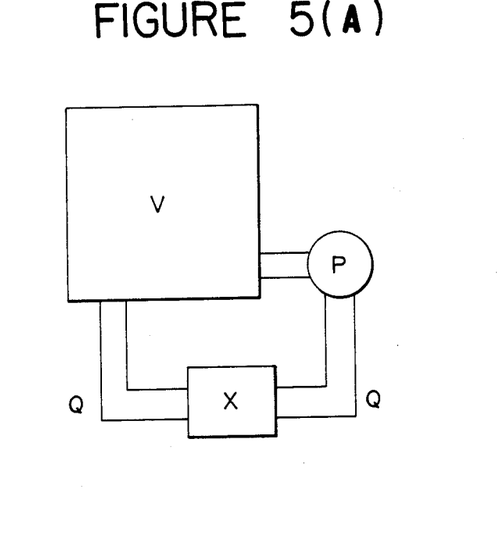
FIG. 5A is a diagram showing a system of a mixing machine according to the invention.
Figure 5B:
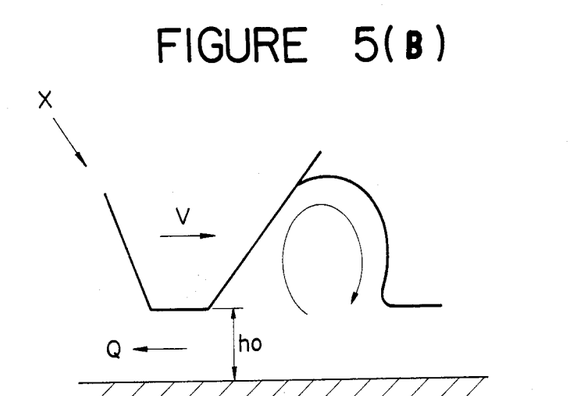
FIG. 5B is a schematical view showing a shearing portion of the mixing machine of the invention.

FIGS. 5A and 5B schematically show a closed mixing machine according to the present invention, in which a pump designated by reference numeral P impels a material flow Q out of a stored charging material V to a shearing region X of a rotor, where the shearing stress is greater than a determined value of shearing stress $\tau c$. When the material flow Q is increased, it becomes possible to reduce a period of time required to allow all the charging material V to undergo an effective shearing stress $\tau$ which is greater than the determined value $\tau c$.

The shearing stress $\tau$ is maintained so as not to become greater than the typical stress value $\tau'$ of the conventional machine, with the result that an excessive torque and local generation of heat can be curbed at an early stage of the operation of the machine. Further, the mixing capacity is not impaired by the problem of too great a space because the mixing space is not reduced since the number of vanes need not be increased.

The relation between the material flow Q and the shearing stress $\tau$ is expressed by configurational conditions and rotation speed N of the rotor as follows:

The material flow Q which passes to rotor tip in the direction normal to the rotor axis, i.e. the radial direction, is expressed in view of a drag flow by the following expression (3).

$$Q = \tfrac{1}{2} V \cdot ho \cdot L \qquad (3)$$

where
Q is material flow (cm$^3$/sec),
V is rotor rotation speed (cm/sec),
ho is rotor tip clearance,
L is rotor axial length (cm), from $$V = \pi RN/60$$

the expression (3) is $$Q = \frac{1}{120} \pi \cdot R \cdot N \cdot ho \cdot L \qquad (4)$$

Thus Q can be increased by increasing ho or N.

If $\tau$ is represented by a maximum shearing stress $\tau$max obtained at the tip region while $\tau$ is distributed in the plane normal to the rotor axis as shown in FIG. 1, the following expression (5) is obtained from the expression (1) and (2), $$\tau\text{max} = K \left( \frac{\pi \cdot R \cdot N}{ho 60} \right)^n \qquad (5)$$

Accordingly, in order to increase Q with $\tau$max being kept at a determined value and without increasing excessively, N and ho should be increased while keeping RN/ho in the expression (5) at a determined value. Specifically, N and ho are increased at a substantially equal rate.

For ascertaining the advantageous effect of the above-described arrangement, that is, how effectively a heat generation and an excessive torque are deterred to achieve a reduced period of the mixing time, a performance test has been made on a simulator model of the mixing machine which has non-intermeshed rotors and a chamber having an inside diameter (203 mm) equal to that of a minimum-sized real machine and a length L being one third the length of the latter. For testing, ho and N have been changed variously under various values of differential rotation ratio of one rotor to the other rotor (1.0–1.2). The effect of phase angle of one rotor's tip to the other rotor's tip has also been evaluated under 1.0 of the differential rotation ratio. The simulator machine also provides the chamber which allows an intermeshed-rotor mode. Performance test of mixing has also been made in an intermeshed-rotor mode.

In testing the break-down mixing of a natural rubber and the master batch mixing of a synthetic rubber (SBR i.e. styrene-butadiene rubber) and a carbon black are carried out. A micro-dispersion effect has been estimated from the results of a mixing time tm required to attain a determined quality, indicated by Mooney viscosity and by the degree of dispersion of carbon black, of the material to be mixed.

Also an evaluation has been made of a discharge temperature Tdis of the rubber material at the time when the material has attained the determined quality, and also of the energy Esp (KWH/kg) consumed in the mixing operation.

Figure 6:
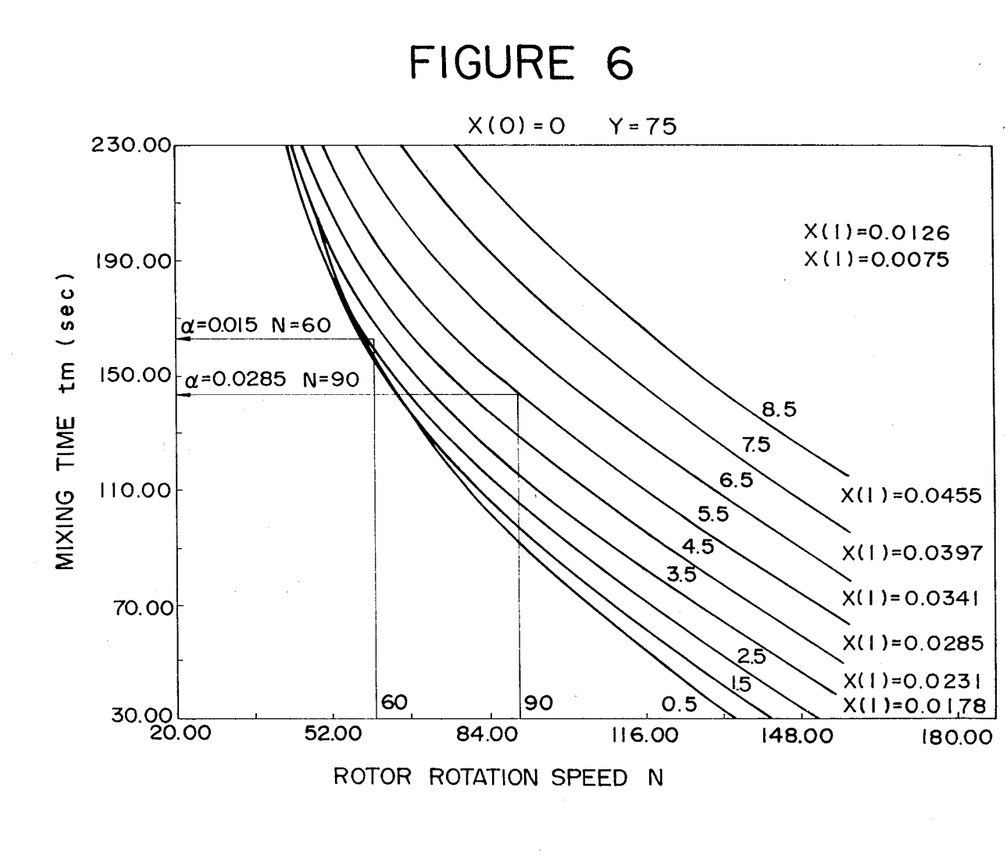
FIG. 6 is a chart showing a relation between the rotation speed N and a required period of mixing time with a uniform quality of mixture (Mooney viscosity is 75) in a master batch operation of SBR and a carbon black.
Figure 7:
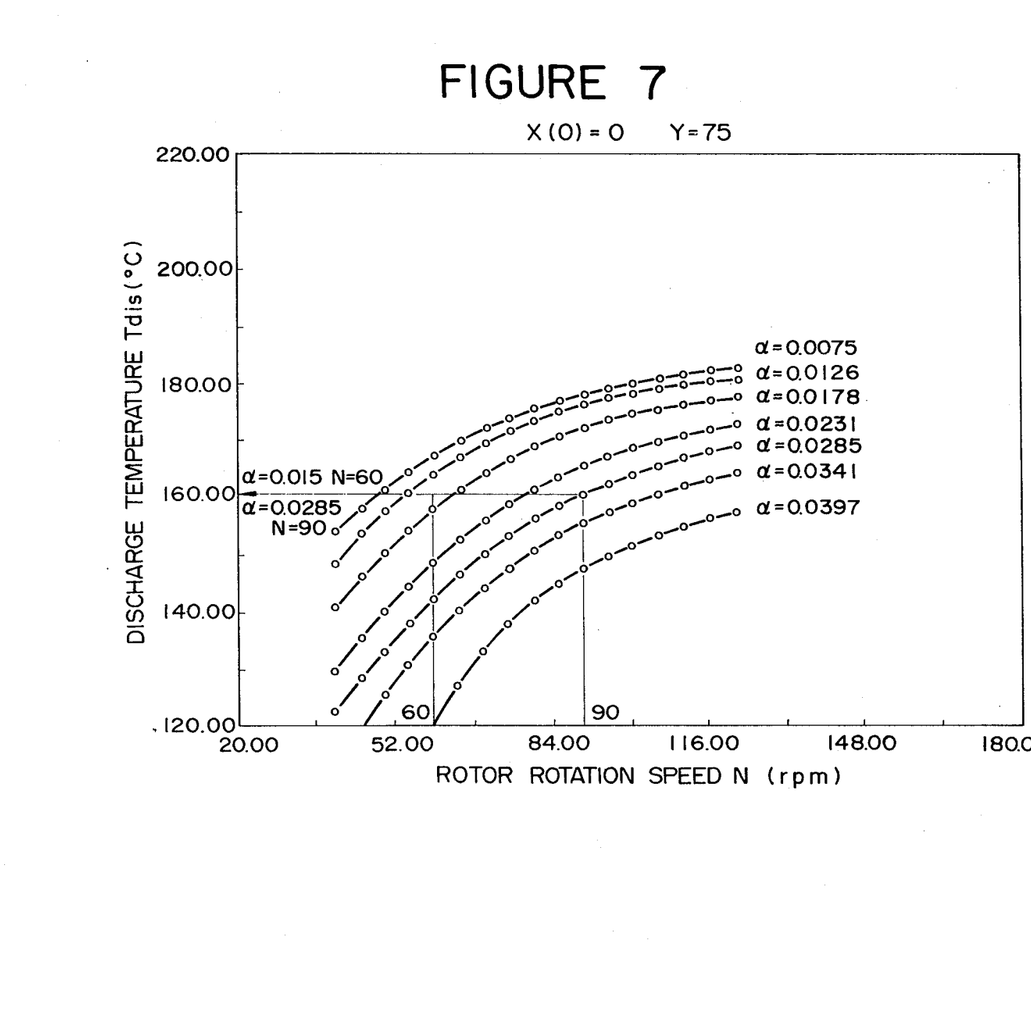
FIG. 7 is a chart showing a relation between the rotation speed N and a discharged material temperature Tdis in the operation of FIG. 6.

The results of the test (in the non-intermeshed mode under 1.2 of differential rotation ratio) are shown in FIGS. 6 and 7, where the quality of the mixed material is evaluated by Mooney viscosity. An effect of ho is shown in view of a relation between the discharge temperature Tdis and the rotation speed N established when a determined value of Mooney viscosity is attained. Since the tip clearance ho differs depending on different sizes of the mixing machine, ratio $\alpha$ of the tip clearance ho to the rotor diameter R($\alpha$=ho/R) is given in place of ho in FIGS. 6 and 7. This replacement is possible because ho increases as R increases.

Considering design conditions of the conventional machine shown in FIGS. 2 and 3, $\alpha$ is smaller than 0.015, and N is 40–70 rpm in the mixing machine for mixing the rubber material. In particular, N is 60 rpm when the rotor diameter is about 200 mm. Here, if standard values are given by $\alpha$=0.015 and N=60 rpm, it is known from FIG. 6 that if ho and N are increased to obtain $\alpha$=0.0285 and N=90 rpm, it becomes possible to decrease a required period of mixing time without impairing the quality of the material in comparison with the standard mixing time. Further, it is known from FIG. 7 that the discharge temperature Tdis is maintained at a value approximately equal to the standard discharge temperature.

In case of the even rotation operation (the differential rotation ratio is 1.0) with various phase angle and the intermeshed-rotor mode, similar results have been obtained although the results are not shown.

Figure 8:
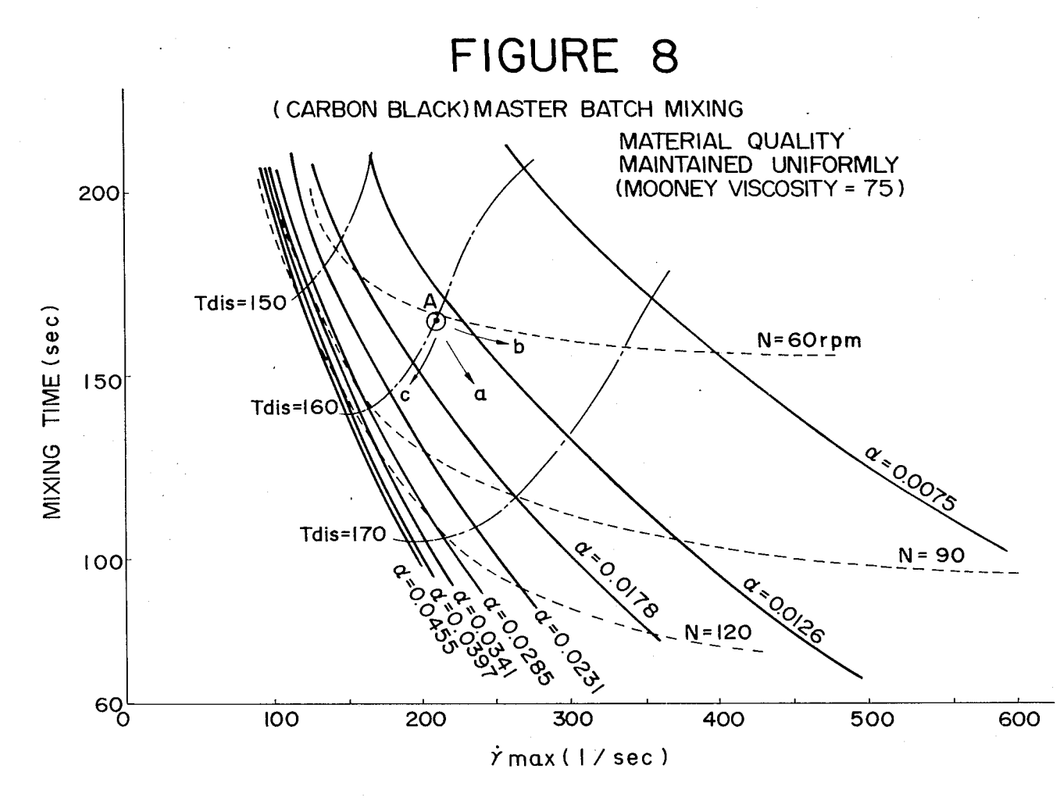
FIG. 8 is a chart showing effects of a ratio (α) of a tip clearance to a chamber diameter in view of the rate of shear γ̇max at a rotor tip and a required period of mixing time, with a uniform quality of mixture (Mooney viscosity is 75) in the master batch mixing of the carbon black.

The obtained results are transformed into the relation between the maximum rate of shear $\dot{\gamma}$max and the mixing time tm shown in FIG. 8, where influences of N and $\alpha$ and the result of Tdis are also shown.

Point A indicates the results of the conventional machine having the standard values: $\alpha$=0.15 and N=60 rpm. If the values are changed by following a course of direction C (by which both $\alpha$ and N increase), it can be acknowledged that the required period of mixing time is reduced with the determined quality and discharge temperature maintained, which means that the micro-dispersion effect is improved.

To follow the direction C results in a decrease of $\tau$max and hence a decrease of $\tau$max, however, the micro-dispersion effect has been improved accordingly. This improvement can be due to the fact that since $\dot\gamma$max is decreased by the increase of ho, and the distance h between the rotor front face and the chamber wall is unchanged, and N is increased, from $\dot\gamma = \pi \cdot R \cdot N/60$ h and $\tau = K \cdot \dot\gamma^\eta$; the shear stress $\tau$ of the front face is increased, and hence the mean stress value of the total shearing stress $\tau$ in the radial direction (i.e. the direction normal to the rotor axis, is kept unchanged while $\tau$max is decreased.

On the other hand, if it follows a course of direction b (by which $\alpha$ decreases with N unchanged) or a course of direction a (by which N increases with unchanged $\alpha$), the period of mixing time is reduced, but the discharge temperature Tdis is increased to thereby cause the foregoing excessive torque and the local heat generation.

Figure 9:
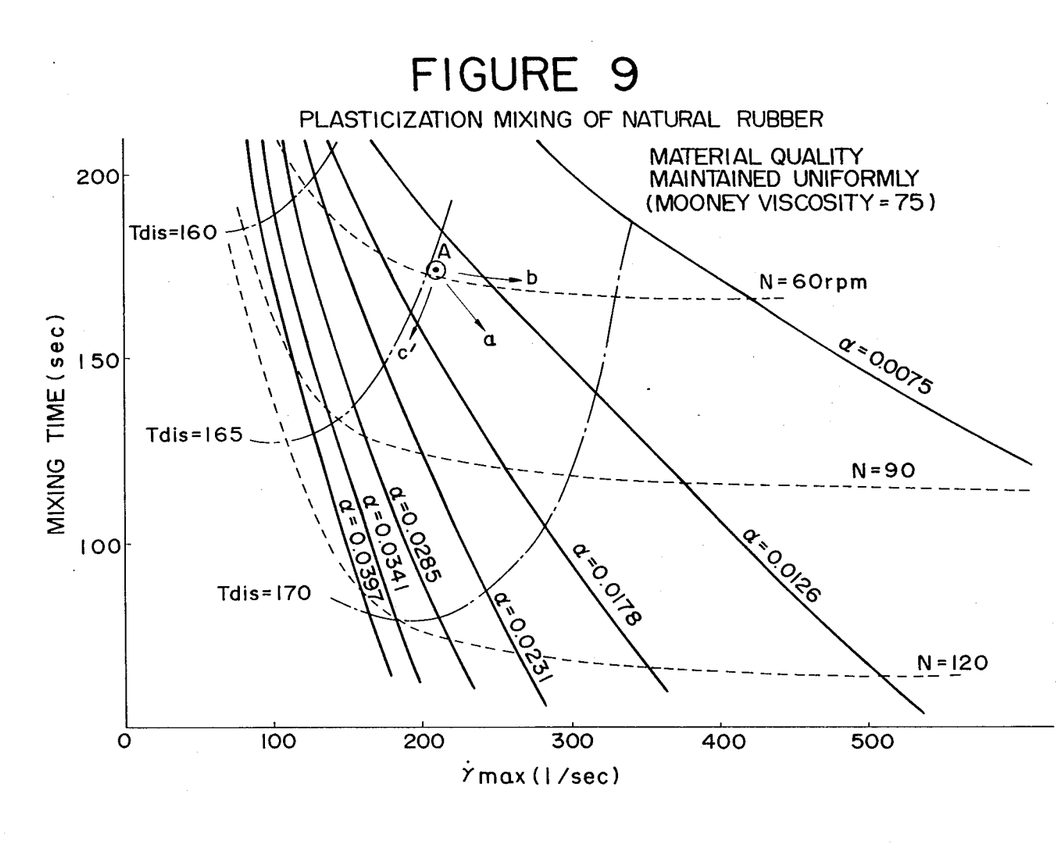
FIG. 9 is a chart showing the effects of α in view of γ̇max and the required period of mixing time in the break-down mixing of a natural rubber material with a uniform quality of mixture (wherein the Mooney viscosity is 75)

FIG. 9 shows an example of the break-down of mixing of the natural rubber. In this case, it also becomes possible to reduce the required period of mixing time with Tdis and the quality unchanged by following a course of direction c' (by which both $\alpha$ and N increase).

Figure 10:
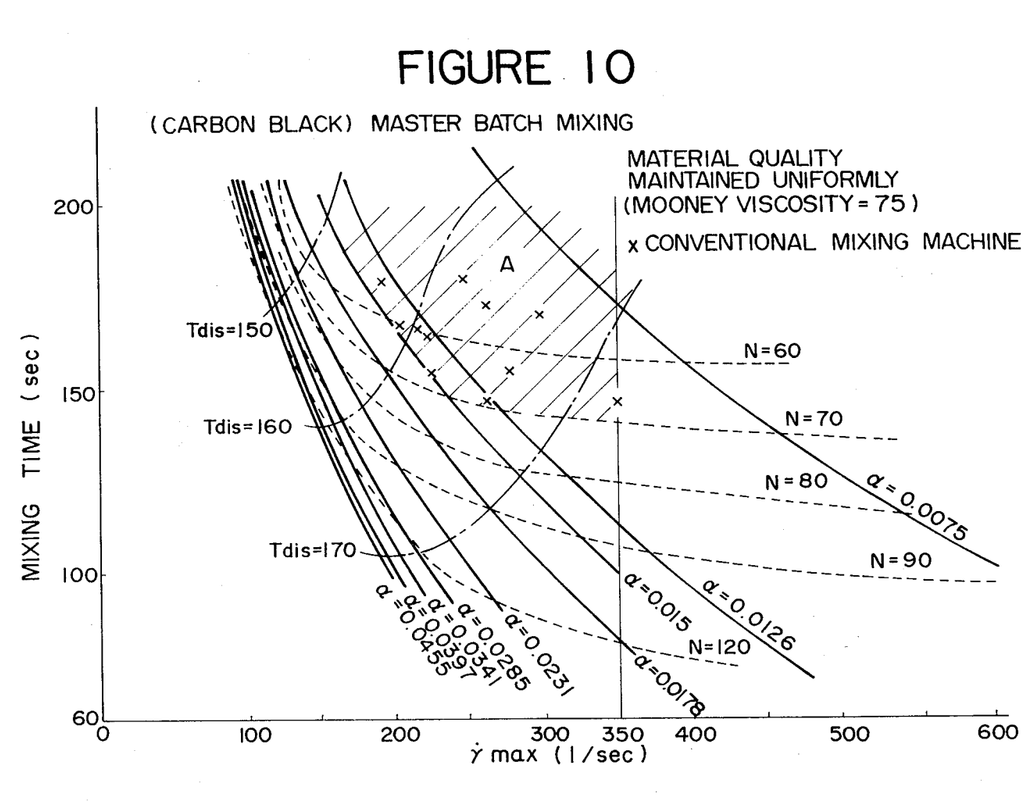
FIG. 10 is a chart similar to FIG. 8, showing results obtained in the conventional mixing machine.
Figure 11:
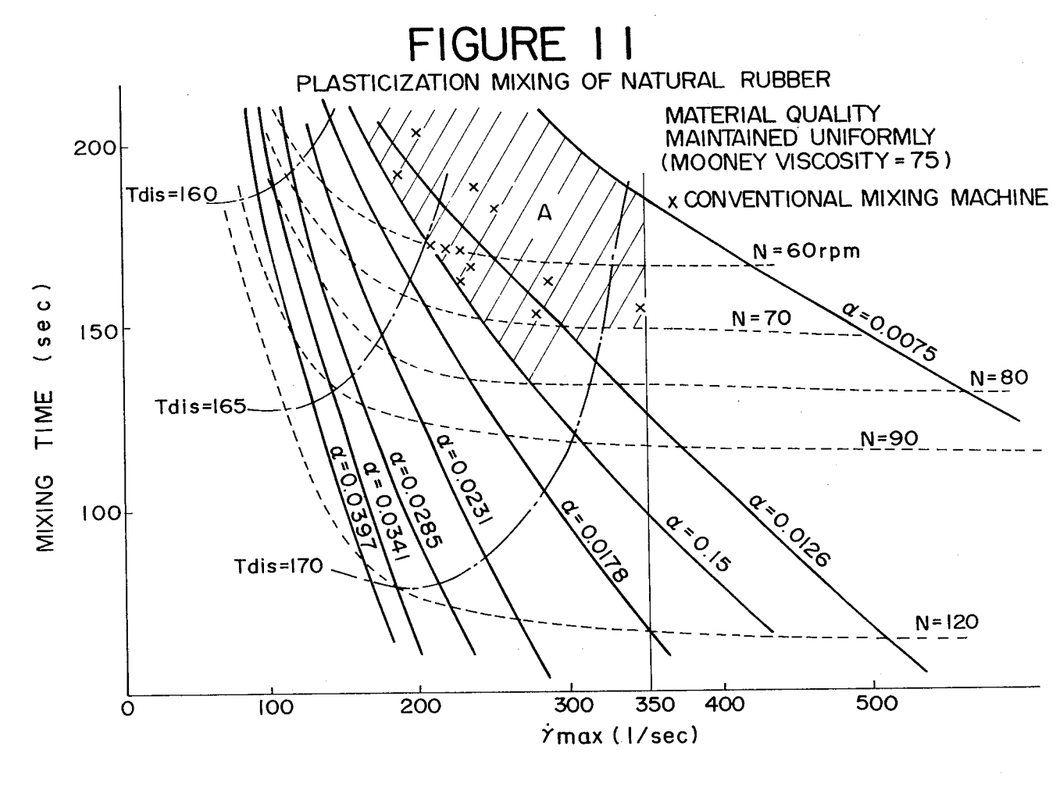
FIG. 11 is a chart similar to FIG. 9, showing results obtained in the conventional mixing machine.
Figure 12:
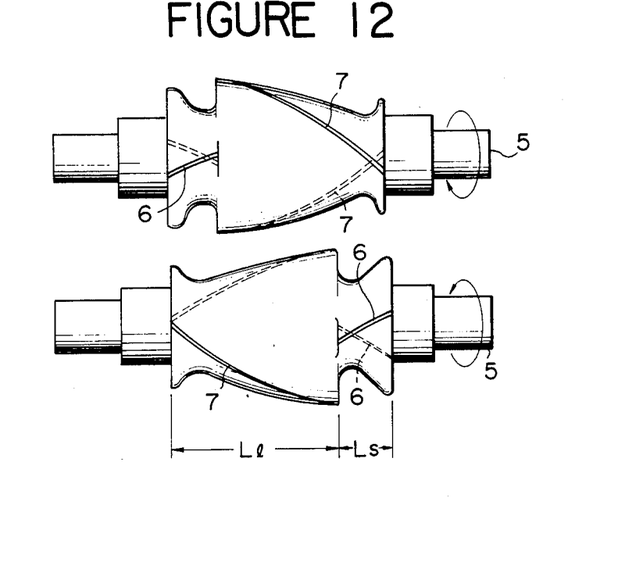
FIG. 12 is a plan view showing a rotor vane shape of a 16-liter mixing machine according to an embodiment of the invention.
Figure 13:
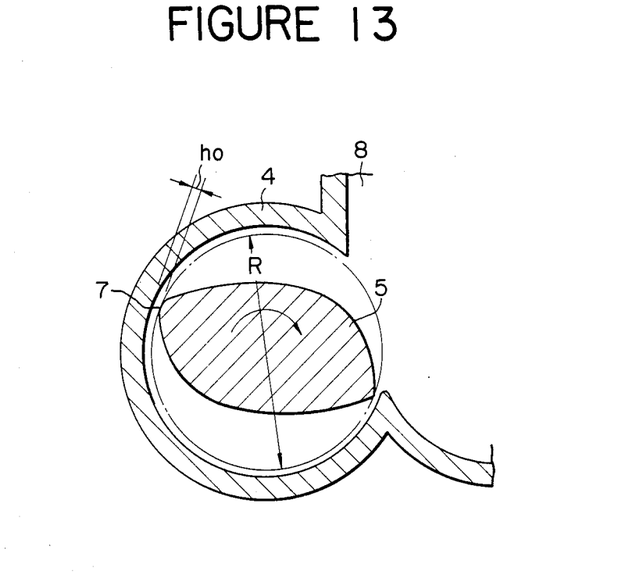
FIG. 13 is a cross-sectional view of the rotor vane of FIG. 12.
Figure 14A:
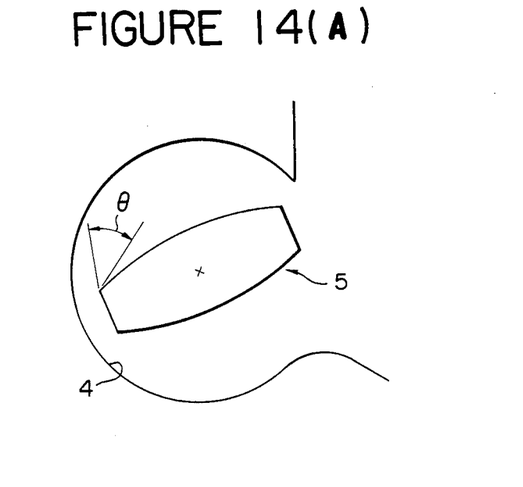
FIG. 14A is a view showing a position of the rotor in the chamber.
Figure 14B:
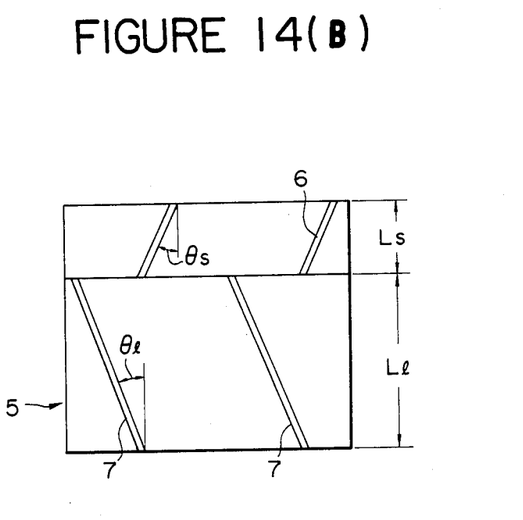
FIG. 14B is a expansion view of the rotor vane according to the invention.

FIGS. 10 and 11 show respectively, the comparison of the micro-dispersion effect created by the conventional mixing machine to that of the present mixing machine, in which figures of the design conditions of the conventional machine appear with the results of FIGS. 8 and 9 in which the maximum rate of shear is smaller than 350 rpm ($\dot\gamma$max < 350). From FIGS. 10 and 11, it can be known regardless of the rotor mode that $0.015 < \alpha < 0.04$, and N is greater than the conventional value, that is, 70–250 rpm, the micro-dispersion effect is improved with the increase of Tdis curbed, and thus resulting in a relatively high productivity. Maximum limit of the rotor rotation speed N has been set at 250 rpm for the following reasons:

In the case of a mixing machine for mixing rubber materials, the maximum limit of rate of shear $\dot\gamma$max obtained at the rotor tip is no greater than 350 sec$^{-1}$. If the rate of shear exceeds this value, the mixing rubber material undergoes the shearing stress of greater than $10^7$ dyne/cm$^2$, which value will cause degradation of the rubber due to the rupture of rubber molecules and a rapid thermal increase. Accordingly, the maximum limit of the rotor rotation speed N for the present mixing machine can be obtained when the maximum value of the rate of shear at the rotor tip is limited to 350 sec$^{-1}$.

In case of the present machine, since $0.015 < \alpha < 0.04(\alpha ho/R)$, and $\dot\gamma$max $= \pi \cdot N/60$ $\alpha < 350$, hence $N < 6684.55 \times \alpha$.

Here, the maximum limit value of $\alpha$ is 0.04. Introducing $\alpha = 0.04$ to the above expression, and we obtain N < 267 rpm.

Consequently, the maximum value of N can be limited as follows:

N ≦ 250 rpm

FIGS. 12 to 14A and 14B show a pair of rotors 5 disposed in parallel in a mixing chamber 4 for rotating in mutually opposite direction. Reference numerals 6, 7 and 8 designate respectively a shorter vane, a longer vane, and a material supply inlet. Regardless of the rotor type, i.e. intermeshed type or non-intermeshed type, the rotor shape is determined as follows:

In order to achieve high productivity under the condition of a relatively high rotation speed and an increase of ho without developing a thermal heterogenity or deteriorating a degree of mixing, the following conditions must be satisfied.

Differential rotation ratio of one rotor to the other rotor is 1.0–1.2. The range of this ratio is determined to make the two rotors consume an uniform amount of energy and generate an uniform amount of heat, if any.

From this point of view, the differential rotation ratio is most preferably 1.0 (that is, the equal speed or the intermeshed-rotor mode). However, no critical problem is created inasmuch as the ratio is smaller than 1.2 in a non-intermeshed-rotor mode. From the viewpoint of superior homogeneity of mixture, the phase angle of one rotor tip to the other rotor tip is 0°±45° preferably (0° means synchronized) under a 1.0 differential rotation ratio. However, no critical problem is created out of the range defined above.

The rotor length/chamber inside diameter ratio is 1.2–2.2. The maximum is due to limit a mechanical strength of the rotor, and minimum limit thereof is selected in view of a surface area required for cooling the rotor.

The front angle $\theta$ of the rotor is 15°–35°. The relationship $15° \leq \theta$ is required to obtain a suitable inclusion or raking effect at the time of charging the material, and the relationship $\theta < 35°$ is required to prevent adherence of the material to the rotor.

The differential rotor length ratio of a shorter vane to a longer vane (Ls/Ll) is determined to be 0.1–0.48. Helix angles $\theta l$, $\theta s$ of the longer and the shorter vanes are determined to be 20°–45° or 45°, respectively. These ratios are determined to prevent a decrease of the mixing degree.

EXAMPLE

Using mixing machines of non-intermeshed rotor type having a mixing chamber specified by an inside diameter of 220 mm and an effective volume (capacity) of 16 liters, comparison has been made between the results obtained by the conventional machine of the typical conditions (N=60 rpm, $\alpha$=0.015) and the results obtained by the present machine of the conditions according to the invention (N=90 rpm, $\alpha$=0.029). Each of the two rotors has four vanes.

The mixing operations exerted are a break-down mixing of the natural rubber material and a master batch mixing of carbon black for producing tires. The mixing has been continued until a result of Mooney viscosity and carbon dispersion reaches a determined level. Then the result of the mixing time tm, discharge temperature Tdis, consumed energy Esp (KWH/kg), maximum batch amount of the charged material, material inclusion (ram-descending time) are compared to one another.

According to the present mixing machine, significant improvements have been obtained in comparison with the conventional machine as set forth hereinbelow:

(a) Productivity (mixing time) is
  increased by 70% (natural rubber)
  increased by 30% (carbon master)
(b) Discharge material temperature is
  not changed (natural rubber)
  not changed (carbon master)
(c) Consumed amount of energy is decreased by 13% (natural rubber)
decreased by 4% (carbon master)
(d) Peak torque is
reduced by 10% (natural rubber)
reduced by 2-10% (carbon master)
(e) Degree of material inclusion and maximum amount of material charged are, when an uniform amount of the material is charged, a period of ram-descending time is
reduced by 50% (natural rubber)
reduced by 25% (carbon master),
and the maximum amount of the material charged is
increased by 9% (natural rubber)
increased by 6% (carbon master).

With the arrangement described hereinabove, the mixing machine according to the present invention enables:
deterring an increase of the material temperature, occurrence of an excessive torque and local heat generation;
reducing a period of mixing time; decreasing peak torque;
reducing consumption of energy;
increasing material inclusion; and
increasing maximum batch amount of the material.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A closed mixing machine, comprising:
a closed mixing chamber formed by a casing and a pair of end frames;
a pair of rotors disposed in parallel in the mixing chamber for rotating in opposite directions with respect to each other, each said rotor having at least one longer vane and at least one shorter vane, wherein a ratio $\alpha$ of a tip clearance $h_o$ to a rotor diameter $R[(=h_o/R)]$ is represented by the relationship $0.015 < \alpha < 0.04$, a rotation speed of said rotors is 70–250 rpm, a rotation speed ratio of one of said rotors to the remaining rotor is 1.0–1.2, a rotor length/diameter ratio is 1.2–2.2, a rotor inclusion angle is 15°–35°, a rotor vane length ratio $L_s/L_l$ is 0.1–0.48, a helix angle $\theta_l$ is 20°–45°, and helix angle $\theta_s$ is 0°–45° wherein $L_s$ is the length of the shorter vane, $L_l$ is the length of the longer vane, $\theta_s$ is the helix angle of the shorter vane, and $\theta_l$ is the helix angle of the longer vane.

* * * * *